No. 641,168. Patented Jan. 9, 1900.
H. P. TERRY.
SELF HEATING SAD IRON.
(Application filed Apr. 6, 1899.)
(No Model.)
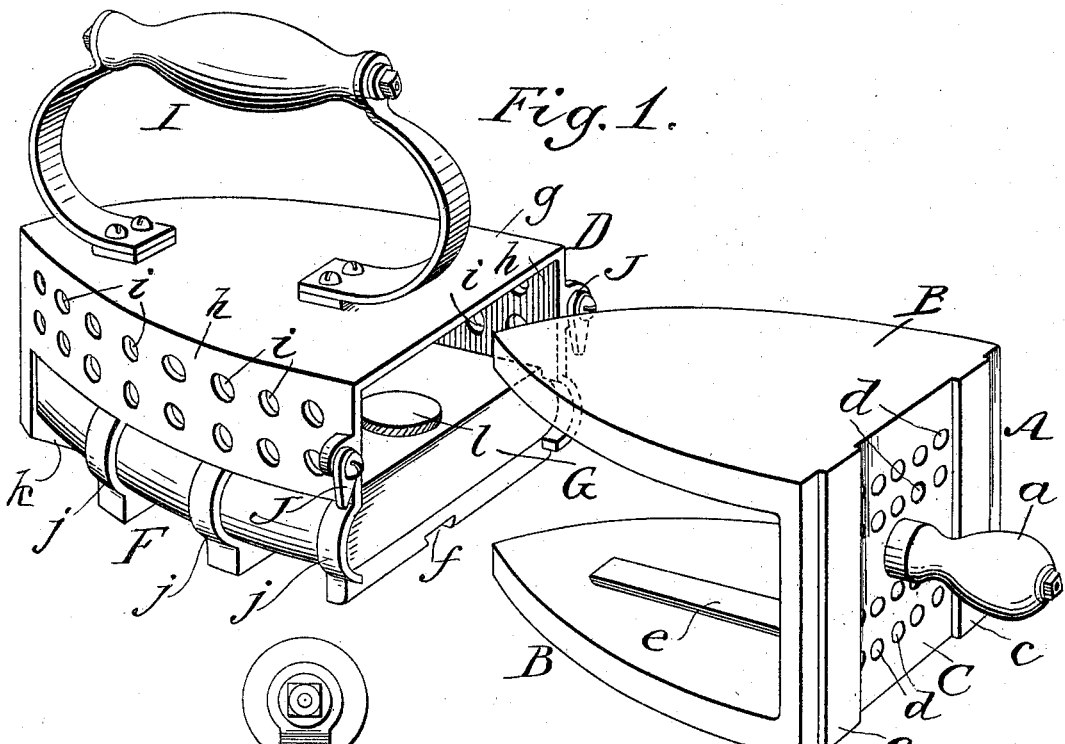
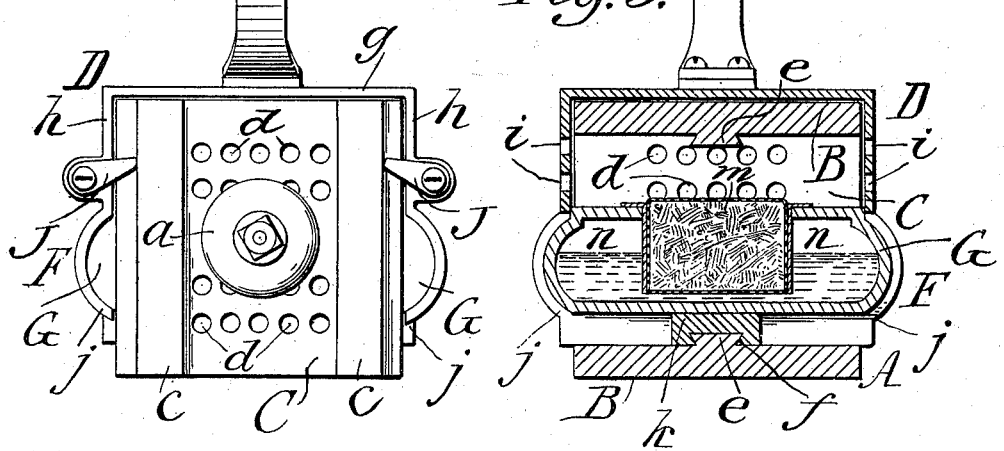
WITNESSES:
M. G. McLean
Geo. E. Barritt
INVENTOR.
Howell P. Terry,
BY
Barr Reemert Co
ATTORNEYS

UNITED STATES PATENT OFFICE.

HOWELL P. TERRY, OF NEW YORK, N. Y.

SELF-HEATING SAD-IRON.

SPECIFICATION forming part of Letters Patent No. 641,168, dated January 9, 1900.

Application filed April 6, 1899. Serial No. 711,936. (No model.)

*To all whom it may concern:*

Be it known that I, HOWELL P. TERRY, a citizen of the United States, and a resident of New York, borough of Brooklyn, county of Kings, and State of New York, have invented certain new and useful Improvements in Self-Heating Sad-Irons, of which the following is a specification, reference being had to the accompanying drawings, forming a part thereof, in which similar letters of reference indicate corresponding parts.

This invention relates to improvements in self-heating sad-irons; and the object thereof is to supply a device of this character which is so constructed that it may be constantly maintained in a heated condition while in use. To attain this object, the device is provided with an interior means for heating and with two integrally-formed smoothing irons or plates adapted for alternate use, the relative arrangement of these plates being such that when one is in use the other is being heated.

The invention will be hereinafter fully described, and specifically set forth in the annexed claims.

In the accompanying drawings, forming part of this specification, Figure 1 is a perspective view of my improved sad-iron, showing the two principal parts thereof disconnected from each other. Fig. 2 is an end view of the device, showing the parts assembled for use; and Fig. 3 is a cross-sectional elevation.

In the practice of my invention I employ primarily an approximately U-shaped iron A, comprising the parallel plates B, which are supplied with smooth outer surfaces, and the end upright wall C, all of these parts being formed integral with each other and composed of cast-iron, steel, or other suitable metal. The end wall C is provided upon its outer surface with strengthening-ribs $c$ and a series of perforations $d$ for admitting of circulation of air within the device when it is in use, as will be hereinafter described. Each plate B is supplied upon its inner surface with a dovetailed tongue or projection $e$ for engagement with a dovetailed groove $f$, formed in the bottom surface of a casing or shell D, adapted for containing the iron A. This said shell comprises a solid upper wall $g$, side walls $h$, which are supplied with perforations $i$, and an open-work bottom portion F, which comprises a series of ribs $j$ and a longitudinal centrally-arranged rib $k$, in the bottom surface of which the groove $f$ is formed. Within this said casing and resting upon the bottom ribs thereof is a removable heater or lamp G, which is supplied with a screw-cap $l$, adapted to be removed for the purpose of filling, and an asbestos burner $m$ of ordinary construction, the body of the said lamp or heater being hollow, whereby a reservoir $n$ is provided for the purpose of containing alcohol or other inflammable liquid to be supplied to the burner. The casing is provided upon its upper surface with an ordinary handle I, and pivoted to lugs on each side thereof at its open end are swinging buttons J. These buttons act as a means for locking the iron A within the casing when the device is in use, as illustrated in Fig. 2 of the drawings.

The iron A is provided with a handle $a$, composed of wood or other non-heat-conducting material, for the purpose of handling the same. In use the smooth surfaces of the plates B are adapted for alternate use as a means for ironing or smoothing garments, fabrics, &c., and while one is being used it is obvious that the other, which is then contained within the casing, is subject to the heating action of the burner $m$, located beneath its lower surface, the perforations through the casing and through the end wall of the iron admitting of free circulation of air and draft to the burner. Thus the plates B may be alternately used and heated as long as the lamp is permitted to burn, whereby the necessity of employing auxiliary means for heating the iron is obviated and the operation of ironing is greatly facilitated.

I do not confine myself to the specific details of mere mechanical construction as herein shown and described, as it is obvious that under the scope of my invention I am entitled to slight structural variations.

Having thus described my invention, what I claim as new, and desire to secure by Letters Patent, is—

1. In a sad-iron, the combination of a perforated shell, a heater within said shell, and a removable iron comprising two parallel plates and an end wall connecting them, and means for fastening the iron and the shell together, substantially as shown and described.

2. In a sad-iron, the combination of a shell having perforations therein, a heating-lamp within said shell, and a handle connected thereto, with a removable iron comprising two parallel plates adapted for alternate contact with the flame of said lamp, and means connecting the two said plates with each other, and means for retaining them in engagement with the said shell, substantially as shown and described.

3. In a sad-iron, the combination of a shell comprising a perforated upper portion and a ribbed lower portion, having a dovetailed groove therein, and a heater or lamp located within said shell, and an iron comprising two integrally-formed smoothing-plates connected by an end wall having a handle thereon, each plate being supplied upon its inner surface with a dovetailed tongue adapted for alternate engagement with the dovetailed groove of the said shell, substantially as shown and described.

In testimony that I claim the foregoing as my invention I have signed my name, in presence of two witnesses, this 5th day of April, 1899.

HOWELL P. TERRY.

Witnesses:
W. P. YOUNG,
M. G. MACLEAN.